July 25, 1961  D. W. SHELMIRE  2,993,420
BOX-WRAPPING SYSTEM
Filed Jan. 9, 1958  3 Sheets-Sheet 1
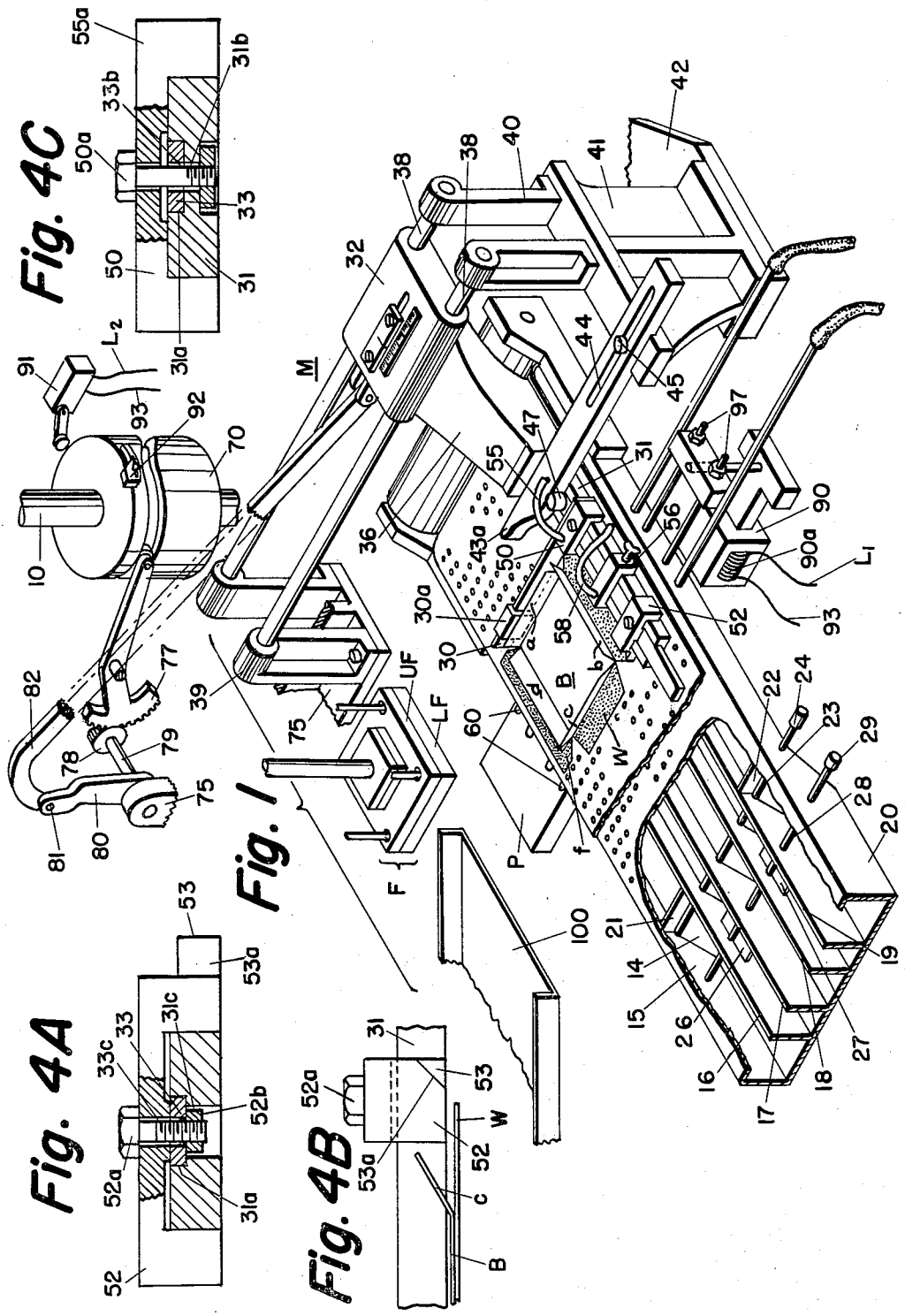

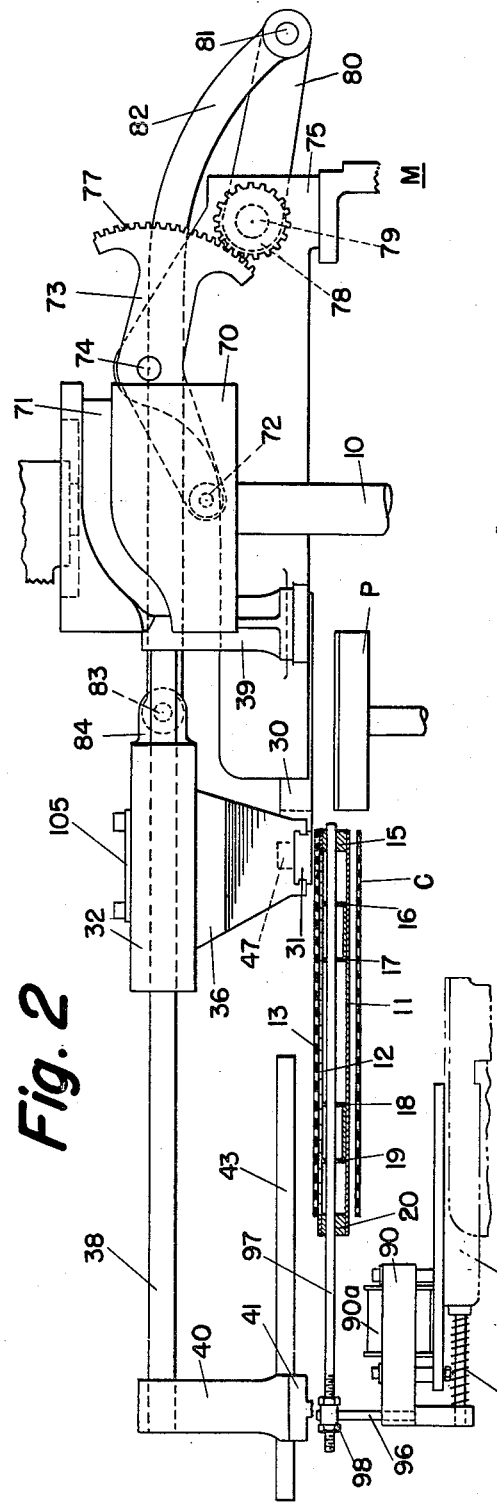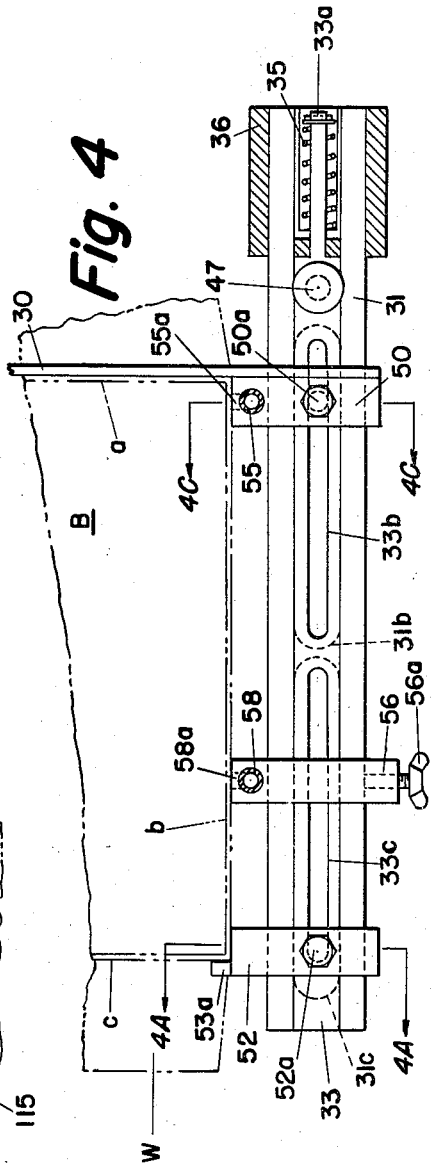

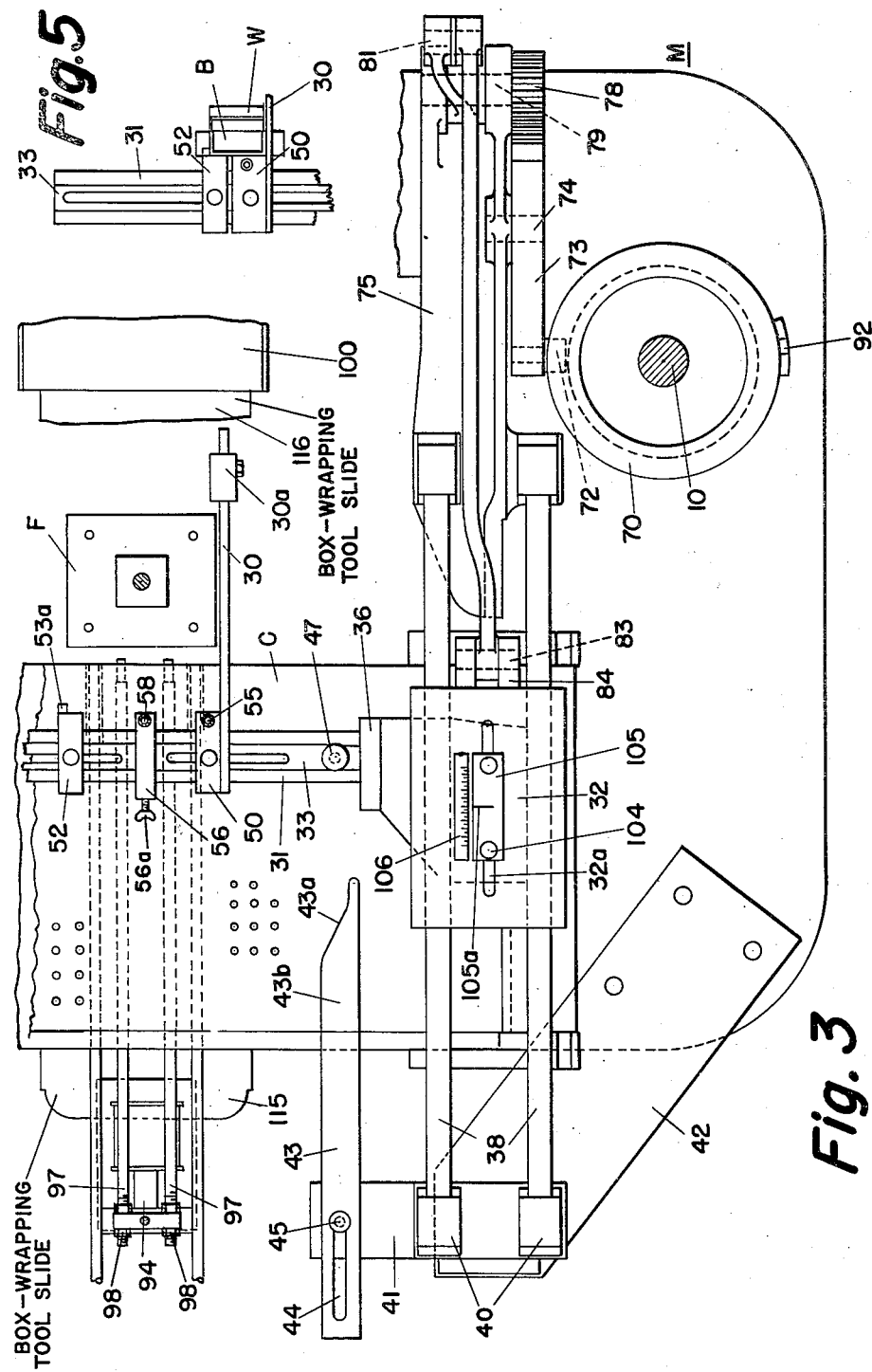

United States Patent Office 2,993,420
Patented July 25, 1961

2,993,420
BOX-WRAPPING SYSTEM
Donald W. Shelmire, McKinley, Pa., assignor to Food Machinery and Chemical Corporation, San Jose, Calif., a corporation of Delaware
Filed Jan. 9, 1958, Ser. No. 707,903
15 Claims. (Cl. 93—54)

This invention relates to box-wrapping systems and particularly to systems for applying wrappers to unstayed box blanks to form boxes, box covers, containers or the like from box and wrapper assemblies.

In accordance with one aspect of the invention, there is provided a transfer mechanism operated by a cam on the main shaft of the box-wrapping machine to transfer box and wrapper assemblies from a transfer station to the wrapping machine. A suction conveyor delivers the box and wrapper assemblies to a transfer station and the transfer mechanism includes a feeder device reciprocable in a parallel plane over the surface of the conveyor. Adjustable cam means is provided for controlling the operation of the feeder device in accordance with the width of the boxes. The suction conveyor is provided with valve means for controlling the suction transversely across the surface of the conveyor in accordance with the width of the wrappers.

In accordance with a further aspect of the invention, there is provided switch means controlled by the cam carried by the shaft of the box-wrapping machine and solenoid-operated ejector means in electrical circuit with the switch means for ejecting wrapped box and wrapper assemblies from the box-wrapping machine.

Further in accordance with the invention, and more specifically, the transfer mechanism includes drive mechanism for the feeder device and a support on the box-wrapping machine for the drive mechanism. The drive mechanism comprises a member pivoted intermediate its ends to the support with one end of the member having a cam roller adapted to be received in the cam track of the cam on the shaft. The other end of the member is provided with a gear segment which is adapted to mesh with a pinion carried by the support. A crank is secured to the pinion and is adapted to rotate therewith and a link pivotally interconnects the crank and the feeder device so that the reciprocation of the feeder device is controlled by the shape of the cam track on the cam.

Further in accordance with the invention and more specifically, the feeder device is supported by a pair of parallel rods which extend over the surface of the suction conveyor. The feeder device comprises a carriage member slideable on the pair of rods and connected to one end of the link of the drive mechanism. The carriage member is adapted to support a feeder bar in parallel position closely above the upper surface of the suction conveyor at the transfer station. The feeder bar includes stop structure for interrupting the advancement of box and wrapper assemblies at the transfer station and spring-biased structure for erecting and gripping the opposite end walls of the box blanks. Suction members are carried by the feeder bar for engaging the rear side wall of the box as it is transported from the conveyor to a position beneath the plunger of the box-wrapping machine.

For a more detailed description of the invention and for further objects and advantages thereof, reference may be had to the following description, taken in conjunction with the accompanying drawings in which:

FIG. 1 is a diagrammatic perspective view of the improved transfer mechanism and transfer station;

FIG. 2 is a side elevation of FIG. 1 with the transfer mechanism in position beneath the plunger of the box-wrapping machine;

FIG. 3 is a top plan view of the improvements shown in FIG. 1 with the transfer mechanism moving towards the transfer station;

FIG. 4 is a plan view of the box feeder device showing a maximum-sized box clamped in position for transfer from the conveyor to the box-wrapping machine;

FIG. 4A is a sectional view taken along the lines 4A—4A in FIG. 4;

FIG. 4B is an end elevation of FIG. 4A;

FIG. 4C is a sectional view taken along the lines 4C—4C in FIG. 4; and

FIG. 5 is a plan view of the box feeder device showing a minimum-sized box held in position.

Referring to FIGS. 1–3, the box machine M preferably is of the type shown in U.S. Patents Nos. 2,074,561 and 2,144,338. The main drive shaft 10 of the machine is driven from a motor, not shown, through a suitable clutch and is adapted to make one complete revolution during each cycle of the box-wrapping machine. The shaft 10 is provided with a main cam, not shown, which is adapted to operate the form block F, FIG. 1, comprising the upper form UF and the lower form LF. During a revolution of the main shaft 10 the form block F is moved from the position shown in FIG. 1 downwardly in a path adjacent various sheet-applying tools and then back to its original position shown in FIG. 1. The movement of the form block and the relative movements of the form block components UF and LF are effected by levers associated with grooves in the main cam in a manner well understood in the art. It is also understood in the art that the size of the form block is selected to suit the particular boxes to be made or wrapped by the machine M. The various sheet-applying tools preferably are of the type shown and described in the aforesaid patents.

A suction conveyor C is intermittently advanced, making one step for each cycle of the box-wrapping machine M to transport adjacent to the path of the form block structure F box and wrapper assemblies each comprising an unstayed box B to which is adhesively attached partially applied sheet material in the form of a wrapper W. The conveyor C is of the suction type including a suction box 11 having a perforated top plate 12 and perforated belt, 13, FIG. 2, for holding the wrapper flat on conveyor by suction as in Stokes Patent 1,701,317 or in Davis Patent 1,818,198. The conveyor transports the wrappers from a gluing machine, not shown, of the type shown in Stokes Patent 1,701,317 or Federwitz Patent 1,772,344 to a transfer station opposite the box-wrapping machine M.

Adjacent the transfer station of the conveyor the suction box 11 of the conveyor is divided into five longitudinal sections separated by walls 15–20. The wrappers W are adapted to leave the gluer at the opposite end of the conveyor and be transported along the center line of the conveyor to the transfer station adjacent the box-wrapping machine M. Since the box-wrapping machine is adapted to handle boxes varying greatly in width, there would be a substantial loss of suction if suction were applied completely across the surface of the suction conveyor when small boxes were being wrapped. In order to eliminate such loss of suction, the sections of the suction conveyor, defined by the pairs of vertical walls 15—16 and 19—20, are provided with control valve means illustrated as butterfly valves 21 and 22, respectively. The butterfly valves 21 and 22 are carried by a common shaft 23 which extends through the suction box of the conveyor and is provided with an exterior handle 24. When medium-sized wrappers are being fed through the box-wrapping system, the handle 24 may be turned to close the butterfly valves 21 and 22, thereby cutting off the suction in the outer longitudinal sections of the conveyor at the transfer station. The inner sections of the suction box, defined by vertical walls 16—17 nad 18—19, are also provided with butterfly valves 26 and 27 respectively which are carried on a common shaft 28. The shaft 28 extends through the suction box of the conveyor and is provided with an exterior handle 29. Thus when smaller wrappers are being transported by the conveyor the valves 26 and 27 may be moved to closed position to cut off suction in the intermediate sections of the suction box of the conveyor. Wtih valves 21, 22, 26 and 27 all in closed position, suction will only be applied to the middle section of the conveyor suction box defined by walls 17 and 18. Thus very small wrappers may be transported by the conveyor with only a minimum loss of suction.

It will be noted that the suction box of the conveyor narrows beyond the valves 26 and 27. This provides clearance beneath the transfer station of the conveyor and enables the wrapping machine to handle deep boxes. The suction box is provided with an inclined surface 14 between the forward valves 26 and 27 and the rear valves 21 and 22 to reduce the depth of the conveyor. Thus the valves 21 and 22 need only be provided with one flap rather than two as in the case of valves 26 and 27.

As the adhesive-coated wrappers W are fed by the conveyor towards the transfer station, the unstayed box blanks B are assembled on the wrappers as shown in the aforesaid Patent 2,144,338. The box and wrapper assemblies are then transported by the perforated belt of the conveyor to the transfer station as shown in FIG. 1. The advancement of the conveyor is so timed as to move the leading end wall $a$ of the box blank B against a vertical surface of a stop 30 to erect the wall $a$. The stop 30 is carried by a novel automatic box feeder device which comprises a bar member 31 supported from a movable carriage 32 in a parallel plane closely above the upper surface of the conveyor. The bottom surface of the bar 31 and stop 30 preferably are supported at about one-eighth of an inch above the conveyor belt. The feeder bar 31 is provided with a central channel or groove 31$a$, FIGS. 4A and 4C within which there is disposed a slideable member 33. The member 33 is connected at one end 33$a$, FIG. 4, to a compression spring 35. The spring 35 and the adjacent end of the feeder bar 31 are disposed in a housing 36 which is adapted to be carried by the carriage 32. The carriage 32, FIG. 1, is adapted to slide on a pair of parallel rods 38 which are supported by fixed support members 39 and 40 carried by the frame of the machine M. The outer support members 40 are carried by a block 41 which in turn is carried by an extension 42, the latter being secured to the frame of the machine M as shown in FIG. 3. The supporting block 41 also is adapted to support an adjustable cam member 43 which extends over the transfer end of the conveyor. The cam member 43 is provided with a slot 44 through which extends a screw 45, which in turn is secured to the supporting block 41. By adjustment of the slot 44 relative to the screw 45, the outer end of the cam member 43 is adjusted relative to a cam roller 47 which is carried by the spring-biased member 33 of the box feeder device. When the cam roller 47 engages the cam rise 43$a$, FIGS. 1 and 3, the spring 35, FIG. 4, is compressed as the cam roller 47 moves away from the carriage 32. When the cam roller engages the top cam surface 43$b$, the spring 35 is in its maximum compressed position preparatory to gripping the end and rear walls $a$—$c$ of a box and wrapper assembly.

As may be seen in FIGS. 1, 3, 4 and 4C, the stop member 30 is secured to the box feeder bar 31 by an adjustable clamp 50 having a bolt 50$a$ which extends through a slot 33$b$ in the slideable member 33 and into a slot 31$b$ in bar 31. The under side of the clamp 50 is provided with clearance with respect to the slideable member 33 so as not to interfere with the movement thereof. A similar clamp 52 is secured by a bolt 52$a$ to the member 33 for movement therewith and clearance is provided between the clamp 52 and the stationary feeder bar 31, as shown in FIG. 4A. The bolt 52$a$ extends through a slot 33$c$ in member 33 and into a slot 31$c$ in member 31. The threaded end of bolt 52$a$ is provided with a nut member 52$b$ having an upper rectangular shoulder adapted to extend into slot 33$c$ to prevent the nut member 52$b$ from turning and interfering with bar 31 during the sliding movement of member 33. The clamp 52 at its forward end is provided with a cam portion 53 having a cam surface 53$a$, FIG. 4B, which has a slope of approximately 45° with respect to the horizontal. The feeder bar 31 and the parts carried thereby are all supported at an elevation above the surface of the conveyor so as to permit the flaps of the adhesive-coated wrapper W to pass therebeneath. After the box and wrapper assembly has moved to the position shown in FIG. 1 with the leading end wall $a$ erected and the conveyor at rest, the box feeder device moves from the position shown in FIG. 1 towards the form block F. This movement is provided by the drive mechanism portion of the transfer mechanism as later to be described. The feeder bar 31 moves towards the rear wall $b$ of the unstayed box blank B and engages it and moves it into a vertical position similar to the position occupied by the leading end wall $a$. The box blanks B have previously been passed through a box bender of any suitable type, as well known in the art, so that the walls of the box blank are inclined upwardly at a predetermined angle as illustrated in FIG. 1 by walls $b$—$d$. The rear wall $b$, FIG. 4, of the box blank is held in vertical position by means of suction which is applied to a port 55$a$ in the forward wall of clamping block 50 by way of a suction hose 55. Intermediate the clamps 50 and 52 there is provided an adjustable clamp 56 which is clamped as by a screw 56$a$ to the feeder bar 31. The forward wall of clamp 56 is provided with a port 58$a$ to which suction is applied by way of a suction hose 58. Both of the suction hoses, 55 and 58, are adapted to be connected to a suitable source of suction having a suitable bleeder valve, not shown.

During the time the box feeder device is moving from the position shown in FIG. 1 to its position in engagement with the rear wall $b$ of the box blank B, usually a distance of about two inches, the cam roller 47 is on the high portion 43$b$ of the cam 43 and the slideable compression member 33 is held in extended position, as shown in FIG. 1. As the clamping members 50, 56 and 52 move into engagement with the rear wall $b$ of the box blank, and move it to the erected vertical position, the cam roller 47 moves off of cam surface 43$b$ and down onto the lower cam surface 43$a$. This causes the clamping member 52, which is carried by the compression member 33, to move to the right as shown in FIG. 1 and causes the cam surface 53$a$ to move under the trailing end wall $c$ of the box blank B and cam the end wall $c$ upwardly into a vertical position, as shown in FIG. 4. With the box B of the box and wrapper assembly gripped in the manner shown in FIG. 4, the box feeder device is moved across the conveyor from the transfer station to a position under the form block F. To assist in supporting the leading flap $f$ of the adhesive-coated wrapper W, there is provided a pair of air jets 60 which extend from the forward side of the conveyor and provide an air stream which tends to hold the leading flap $f$ of the adhesive-coated wrapper W in a horizontal position and prevent it from curling into engagement with the platen P, which is disposed directly beneath and in line with the form block F. The air jets 60 are connected by way of tubing to a suitable source of air pressure, not shown.

With the box and wrapper assembly gripped by the box feeder device, as shown in FIG. 4, the transfer mechanism, including the carriage 32, is moved towards the box machine until the box B is directly beneath the form block F and over the platen P as shown in FIG. 2. The form block moves downwardly into engagement with the box blank and then moves the box and wrapper assembly downwardly through suitable wrapping tools in a manner well known in the art. The wrapped box then moves upwardly where it rests on the platen P in the position shown in FIG. 2, while the form block F is raised to an upper position, as shown in FIG. 1. This completes the wrapping cycle of the machine and the wrapped box is ready to be ejected from the machine.

The drive mechanism portion of the transfer mechanism is operated by a barrel cam 70 which is mounted for rotation on the main shaft 10 of the box-wrapping machine M. The cam 70 is provided with a cam track 71 for receiving a cam roller 72. The cam roller 72 is carried at one end of a member 73 which is pivoted intermediate its ends at 74 to a support structure 75 carried by the frame of the machine M. The opposite end of the member 73 is provided with a gear segment 77 which is adapted to mesh with a pinion 78 carried by a stub shaft 79 which is journalled in the support 75. Fixed to the opposite end of the stub shaft 79 is a crank arm 80 to the outer end of which there is pivotally connected at 81 a link 82. The link 82 is connected at its opposite end by way of a pin 83 to a clevis 84 secured to the carriage 32 of the feeder device. As mentioned above, the main shaft 10 makes one complete revolution during each cycle of the box-wrapping system and thus the cam 70 likewise makes one revolution during each cycle. The cam track 71 is so shaped to provide a dwell of the box feeder device beneath the plunger of the box-wrapping machine and over the transfer station of the conveyor.

In the preferred embodiment, the cam track 71 is shaped to provide in sequence a dwell of the feeder device under the plunger of the wrapping machine during rotation of the cam 70 through about 26°, transfer of the feeder device to the transfer station of the conveyor during rotation of the cam 70 through about 90°, a dwell of the feeder device over the transfer station of the conveyor during rotation of cam 70 through about 175°, and transfer of the feeder device with a box and wrapper assembly to a position beneath the plunger or form block of the box-wrapping machine during rotation of the cam through about 69°.

Referring to FIG. 2, it will be noted that the pinion 78, the crank 80 and the link 82 are so constructed and arranged with respect to the carriage 32 for the feeder bar that the axis of the pinion shaft 79 and the pivots 81 and 83 which respectively connect the ends of the link 82 to the crank arm 80 and the carriage 32 all lie in a straight line at the extreme ends of the stroke of the transfer mechanism. This construction insures that the feeder bar device will have a smooth movement at the beginning and ending of each stroke of the transfer mechanism and that the transfer mechanism will have a positive length of stroke to assure that the box feeder device will assume perfectly aligned positions at the opposite ends of each stroke. The crank arm 80 during each forward and reverse stroke of the transfer mechanism moves through an arc of approximately 184°.

The transfer mechanism is easily adjustable for handling box and wrapper assemblies of a wide variety of sizes, such for example as illustrated by FIGS. 4 and 5. As previously mentioned, the transfer mechanism has a fixed length of stroke. In order to adapt the transfer mechanism to accommodate boxes of different widths, the carriage 32 is provided with a slot 32a through which there extends a pair of bolts 104 which are secured to the housing member 36 which in turn supports the feeder bar 31. The bolts 104 are adapted to pass through a marker plate 105 which bridges the slot 32a and includes an index mark 105a which is adapted to cooperate with a scale plate 106 on the upper surface of the carriage 32.

By loosening the bolts 104 and moving the marker plate 105 along the scale 106, the feeder device will be automatically adjusted to accommodate boxes of different widths. To accommodate boxes of different lengths, the clamping blocks 50 and 52 may be moved relative to each other and clamped in different positions by their respective locking members 50a and 52a. As previously mentioned, the box and wrapper assemblies are advanced along the center line of the conveyor belt and thus when the feeder bar 31 is being adjusted to accommodate boxes of different width, the adjustment by means of bolts 104 is likewise made relative to the center line of the conveyor.

After the box and wrapper assembly has been completed into a wrapped box, it assumes a position on the pedestal P, FIG. 2, ready to be ejected from the box-wrapping machine. This is accomplished in timed sequence by means of a solenoid-operated ejector 90 which is operated by an electric switch 91 which in turn is actuated by an adjustable cam plate 92 carried by the cam 70, FIG. 1. As may be seen in FIGS. 1-3, the solenoid ejector 90 is mounted on a slide 115 on the frame of the machine M beneath the transfer station of the conveyor C. The coil 90a of the solenoid is adapted to be energized from a suitable source of power, not shown. The switch 91 is in series circuit with the solenoid with wires 93 being connected and leads L-1 and L-2 being connected to the power source. The armature 94 of the solenoid is provided with a compression spring 95 to bias it to the retracted position shown in FIGS. 2 and 3. At the outer end of the armature 94 there is provided a vertical support 96 to which is connected a pair of ejector rods 97. The forward ends of the rods 97 are adapted to extend through openings provided in the side walls of the conveyor and at an elevation which is just above the upper surface of the platen P as shown in FIG. 2. The rear ends of the ejector rods 97 are adjustably secured to the support 96 as by nuts 98.

After a box and wrapper assembly has been completed and converted into a wrapped box, it assumes a position on the plunger P at the elevation shown in FIG. 2. The cam plate 92 is so positioned on the barrel cam 70 so that at this time the switch 91 is actuated to close the circuit and energize the coil 90a of the solenoid causing the armature 94 to be drawn into the coil against the compression of spring 95. This action causes the ejector rods 97 likewise to move to the right, as shown in FIG. 2 so that their forward ends pass through the conveyor and strike the adjacent wall of the completed box. The quick engagement of the ejector rods 97 with the completed box causes the latter to be projected off from the pedestal P and out of the box-wrapping machine M by way of a discharge chute 100. It will be noted that the ejector rods 97 are positioned closely together so as to be effective in ejecting small boxes as well as large boxes.

As may be seen in FIG. 3, the solenoid ejector 90 and the discharge chute 100 are both mounted on a pair of oppositely-disposed slides 115 and 116 of the box-wrapping machine M. These slides also are adapted to support the box-wrapping tools for working on the opposite side walls of the boxes, as well-known in the art. When the operator adjusts the slides 115 and 116 to enable the box-wrapping machine M to wrap boxes of a different size, the solenoid ejector 90 and the discharge chute 100 are automatically adjusted to accommodate the new size of boxes since they are carried by the same slides 115 and 116 as the box-wrapping tools. Thus once the solenoid ejector 90 and the discharge chute 100 are mounted on the box-wrapping machine M, they will always be in the correct position for handling any size of box being wrapped by the machine.

Some pasteboard is more flexible than others and this flexibility is more apparent on deeper boxes. In order to insure that the forward end flap $a$ of the box blank B is not bent backward too far so as to interfere with the insertion of the form block F, the end stop 30 is provided with an adjustable block 30a which is carried near the outer end as shown in FIGS. 1 and 3. The block 30a is adjustably secured to the member 30 as by screws. When the box and wrapper assembly is advanced along the center line of the conveyor C, the leading end wall a of the box B engages the block 30a and moves the leading end wall a of the box to a substantially vertical position. If the box is particularly deep, and the cardboard flexible, or if the dwell time of the feeder device is insufficient, the leading end wall a may be bent towards the bottom of the box blank so as to form an angle therewith less than 90°. It will be noted that the block 30a projects outwardly from the stop 30 towards the end wall a of the box blank. Thus when the feeder device moves towards the form block to engage the rear wall b of the box blank, the end wall a slides off of the block 30a and against the stop 30. This permits the end wall a to straighten up and assume a vertical position thus insuring that the form block F can enter the interior of the box and wrapper assembly. The block 30a does not interfere with the action of the form block F as it is beyond the form block when the feeder device is positioned beneath the form block of the wrapping machine. This arrangement is particularly advantageous as it relieves any overbending of the leading end wall of the box blank when it is brought against the stop of the feeder device and thus prevents the form block F from damaging the box blanks when the box and wrapper assemblies are transferred to the box-wrapping machine.

With the above understanding of the invention, it will be understood that various modifications may be made within the spirit and scope of the appended claims. While the invention has been described in connection with unstayed boxes, it is to be understood that it is equally applicable to the handling of stayed work as shown in Lange et al. Patent 2,705,905.

What is claimed is:

1. In a box-wrapping system, including a box-wrapping machine having a shaft rotatable in each cycle of the system, a cam carried by said shaft, a transfer mechanism operated by said cam to transfer box and wrapper assemblies from a transfer station to said wrapping machine, a suction conveyor for delivering the box and wrapper assemblies to the transfer station, said transfer mechanism including a feeder device reciprocable in a parallel plane over the surface of said conveyor, adjustable cam means including structure projecting into the path of movement of said feeder device and engageable therewith during each cycle for controlling the operation of said feeder device relative to the length of the boxes in accordance with the width of the boxes, said feeder device comprising box stop structure extending across the center line of said conveyor in the path of advancement of the boxes and a clamping member biased towards said box stop structure, said clamping member being movable relative to said box stop structure lengthwise of said conveyor by said adjustable cam means during each cycle of said system to grip the leading and trailing end walls of a box therebetween, and valve means for controlling the suction transversely across the surface of said conveyor in accordance with the width of the wrappers.

2. In a box-wrapping system according to claim 1 wherein said transfer mechanism includes a drive mechanism for said feeder device, a support on said machine for said drive mechanism, said drive mechanism comprising a member pivoted intermediate its ends to said support, one end of said member having a cam roller adapted to be received in the cam track of said cam on said shaft, the other end of said member having a gear segment, a pinion carried by said support and adapted to mate with said gear segment, a crank secured to said pinion and rotating therewith, and a link pivotally interconnecting said crank and said feeder device, the reciprocation of said feeder device being controlled by the shape of said cam track on said cam.

3. In a box-wrapping system according to claim 2 wherein said cam track is shaped to provide in sequence a dwell of said feeder device under the plunger of said wrapping machine during rotation of said cam through about 26°, transfer of said feeder device to said conveyor during rotation of said cam through about 90°, a dwell of said feeder device over the transfer station of said conveyor during rotation of said cam through about 175°, and transfer of said feeder device with a box and wrapper assembly to said plunger during rotation of said cam through about 69°.

4. In a box-wrapping system, including a box-wrapping machine having a shaft rotatable in each cycle of the system, a cam carried by said shaft, a suction conveyor for delivering the box and wrapper assemblies to a transfer station, a transfer mechanism operated by said cam to transfer box and wrapper assemblies from the transfer station to said wrapping machine, switch means controlled by said cam, and solenoid-operated ejector means extending through said conveyor adjacent said box-wrapping machine and in electrical circuit with said switch means, said ejector means being disposed at said transfer station beneath the upper surface of said conveyor and cyclically movable transversely of said conveyor for ejecting wrapped box and wrapper assemblies from said box-wrapping machine to the side thereof opposite from said conveyor during each cycle of said system.

5. In a box-wrapping system according to claim 4 wherein said ejector means includes a pair of closely spaced rods secured to the armature of said solenoid and extending through said conveyor and beneath the upper surface thereof in the direction of said box-wrapping machine to be effective in ejecting small boxes as well as large boxes.

6. In a box-wrapping system a transfer mechanism for transporting unstayed box and wrapper assemblies from a conveyor to a box-wrapping machine, said transfer mechanism comprising a reciprocable carriage, a box-feeder device supported from said carriage comprising a feeder bar, a slideable spring-biased member carried by said bar, a box stop carried by said bar and adapted to engage the leading end wall of box structure to erect it to a vertical position, a suction member carried by said bar and adapted to engage the rear wall of the box structure to erect it to a vertical position, and a clamping member carried by said slideable spring-biased member, said clamping member having a projection adapted to engage the trailing end wall of the box structure, said projection having a sloping cam surface adapted to cam the trailing end wall of the box structure to a vertical position.

7. A box-wrapping system according to claim 6 wherein said slideable spring-biased member is provided with a cam roller which is adapted to engage a stationary cam and move said clamping member relative to said box stop for clamping the opopsed end walls of the box structure therebetween.

8. A box-wrapping system according to claim 6 including a second suction member carried by said feeder bar, said second suction member being positioned intermediate said first suction member and said clamping member, both of said suction members and said clamping member being adapted to engage the rear wall of the box structure and hold it in a vertical position at a location spaced from said feeder bar.

9. A box-wrapping system according to claim 6 wherein said box-feeder device is adjustable relative to said carriage and relative to the center line of said conveyor for transporting unstayed box and wrapper assemblies of different sizes from said conveyor to said box-wrapping machine.

10. In a box-wrapping system according to claim 6 including an air blast device extending beneath said conveyor, said air blast device being adapted to provide a blast of air between said conveyor and said box-wrapping machine for supporting the leading unapplied flap of the wrapper during transfer of the box and wrapper assembly from said conveyor to said box-wrapping machine.

11. In a box-wrapping system, a box-feeder device comprising a feeder bar, said feeder bar having a groove in the upper surface thereof, a slideable member disposed in said groove, a compression spring adapted to bias said slideable member relative to said feeder bar, a clamping member secured to said feeder bar adjacent one end thereof, said clamping member being adapted to support a box stop, a second clamping member secured to said slideable member and movable relative to said feeder bar adjacent the opposite end thereof, both said feeder bar and said slideable member having elongated slots extending therethrough and adapted to receive structure for adjustably securing said clamping members respectively to said feeder bar and to said slideable member to adapt said box feeder device for handling box structures of different sizes.

12. In a box-wrapping system including transfer mechanism adapted to transfer box and wrapper assemblies of different size from a transfer station to a box-wrapping machine, the improvement comprising a suction conveyor including an endless belt for transporting box and wrapper assemblies along the center line thereof to said transfer station, said suction conveyor having a suction box disposed beneath said belt and divided into a plurality of sections extending lengthwise thereof, one of said sections being disposed centrally of said conveyor along the center line thereof and pairs of sections symmetrically disposed on each side of said central section, and valve means within said suction box for selectively controlling each of said pairs of sections symmetrically with respect to said central section.

13. In a box-wrapping system, a transfer mechanism for transporting unstayed box and wrapper assemblies from a conveyor to a box-wrapping machine and beneath the form block thereof, said transfer mechanism comprising a reciprocable carriage, a box-feeder device supported from said carriage, a box stop carried by said box-feeder device and extending across the center line of said conveyor in the path of advancement of said assemblies, projecting structure on said box stop adjacent the leading end thereof for initially engaging the leading end wall of the unstayed box to guide it to an erected position forming an angle of less than 90° with respect to the bottom of the box, said carriage being adapted to slide said structure towards the form block out of engagement with said leading end wall and permit said end wall to assume a vertical position against said stop for transfer of said box and wrapper assembly to said box-wrapping machine to receive said form block.

14. In a box wrapping system a transfer mechanism for transporting box and wrapper assemblies from a transfer station disposed along the center line of a conveyor to a box wrapping machine, said transfer mechanism comprising a reciprocable carriage, a box feeder device supported from said carriage and above said conveyor comprising a feeder bar, a slideable member carried by said bar, a box stop carried by said bar and having a length sufficient to extend across the center line of the conveyor to engage the leading end wall of box structure and holding it in a substantially vertical position, a clamping member carried by said bar and adapted to engage the rear wall of the box structure, a second clamping member carried by said slideable member and of relatively short length as compared to said box stop for engaging the trailing wall of the box structure, and a compression spring adapted to bias said slideable member relative to said feeder bar to grip the leading and trailing end walls of said box structure between said box stop and said second-named clamping member, said box stop and said clamping members all cooperating to hold the respective walls of the box structure in vertical position.

15. In a box-wrapping system, including a box-wrapping machine having a shaft rotatable in each cycle of the system, a cam carried by said shaft, a transfer mechanism operated by said cam to transfer box and wrapper assemblies from a transfer station to said wrapping machine, a suction conveyor for delivering the box and wrapper assemblies to the transfer station, said transfer mechanism including a feeder device reciprocable in a parallel plane over the surface of said conveyor, adjustable cam means including structure projecting into the path of movement of said feeder device and engageable therewith during each cycle for controlling the operation of said feeder device relative to the length of the boxes in accordance with the width of the boxes, said feeder device comprising a pair of clamping members biased towards each other and relatively movable lengthwise of said conveyor during each cycle of the system to grip the leading and trailing end walls of the box therebetween, valve means for controlling the suction transversely across the surface of said conveyor in accordance with the width of the wrappers, switch means controlled by said cam carried by said shaft, and solenoid-operated ejector means in electrical circuit with such switch means, said ejector means being disposed beneath said surface of said conveyor and cyclically movable transversely of said conveyor for ejecting wrapped box and wrapper assemblies from said box-wrapping machine to the side thereof opposite from said conveyor.

References Cited in the file of this patent

UNITED STATES PATENTS

| Number | Name | Date |
| --- | --- | --- |
| 1,131,792 | Reifsnyder | Mar. 16, 1915 |
| 1,902,079 | Johnson | Mar. 21, 1933 |
| 2,202,496 | La Bombard | May 28, 1940 |
| 2,508,086 | Alvarez | May 16, 1950 |
| 2,757,586 | Haessler | Aug. 7, 1956 |